US007568149B2

(12) United States Patent
Edwards et al.

(10) Patent No.: US 7,568,149 B2
(45) Date of Patent: Jul. 28, 2009

(54) METHOD AND SYSTEM FOR CONTROLLING THE OPERATION OF HYPERLINKS

(75) Inventors: Gregory W. Edwards, Austin, TX (US); Benjamin A. Knott, Round Rock, TX (US)

(73) Assignee: AT&T Labs, Inc., Austin, TX (US)

( * ) Notice: Subject to any disclaimer, the term of this patent is extended or adjusted under 35 U.S.C. 154(b) by 1222 days.

(21) Appl. No.: 10/134,103

(22) Filed: Apr. 29, 2002

(65) Prior Publication Data

US 2003/0204815 A1    Oct. 30, 2003

(51) Int. Cl.
    *G06F 17/00*    (2006.01)
(52) U.S. Cl. ...................................... 715/205; 715/234
(58) Field of Classification Search .............. 715/501.1, 715/513, 526, 901, 205, 234, 273
    See application file for complete search history.

(56) References Cited

U.S. PATENT DOCUMENTS

| 5,675,752 | A  | * | 10/1997 | Scott et al. ................... 715/866 |
| 5,933,142 | A  |   | 8/1999  | LaStrange et al. ............ 345/340 |
| 5,977,972 | A  |   | 11/1999 | Bates et al. ................... 345/341 |
| 5,983,227 | A  | * | 11/1999 | Nazem et al. .................. 707/10 |
| 6,029,182 | A  | * | 2/2000  | Nehab et al. .................. 715/523 |
| 6,243,721 | B1 | * | 6/2001  | Duane et al. .................. 715/505 |
| 6,292,185 | B1 |   | 9/2001  | Ko et al. ....................... 345/334 |
| 6,313,854 | B1 |   | 11/2001 | Gibson ......................... 345/788 |
| 6,324,553 | B1 |   | 11/2001 | Cragun et al. ................ 707/513 |
| 6,338,059 | B1 |   | 1/2002  | Fields et al. .................... 707/4 |
| 6,493,000 | B1 | * | 12/2002 | Wynn et al. ................... 715/733 |
| 6,745,367 | B1 | * | 6/2004  | Bates et al. ................... 715/500 |
| 6,791,582 | B2 | * | 9/2004  | Linsey et al. ................. 715/752 |
| 2002/0012010 | A1 |   | 1/2002 | Pasquali |
| 2002/0083075 | A1 | * | 6/2002 | Brummel et al. ............. 707/102 |
| 2003/0167229 | A1 | * | 9/2003 | Ludwig et al. ................ 705/40 |
| 2003/0191736 | A1 | * | 10/2003 | Reid et al. ...................... 707/1 |

OTHER PUBLICATIONS

Na, Jin-Cheon, et al, "Hypermedia and Graphics 1: Dynamic Documents: Authoring, Browsing and Analysis Using a High-Level Petri Net-Based Hypermedia System", Proceedings of the 2001 ACM Symposium on Document Engineering, Nov. 2001, pp. 38-47.*

Lemay, Laura, et al, Sams Teach Yourself Web Publishing with HTML 4 in 21 Days, Sams Publishing, 2000, pp. 351, 360, 374-377.*

Loke, Seng Wai, et al, "Logic Programming With the World-Wide Web", Proceedings of the Seventh ACM Conference on Hypertext, Mar. 1996, pp. 235-245.*

Phelps, Thomas A., et al, "Innovative Document Systems: The Multivalent Browser: A Platform for New Ideas", Proceedings of the 2001 ACM Symposium on Document Engineering, Nov. 2001, pp. 58-67.*

* cited by examiner

*Primary Examiner*—Laurie Ries
(74) *Attorney, Agent, or Firm*—Jackson Walker L.L.P.

(57) ABSTRACT

A method and system for allowing users to control the operation of hyperlinks includes a graphical user interface that displays Internet and intranet hyperlinks from web sites. The graphical user interface includes a selectable button that accepts user settings. The user settings allow the users to determine the operation of the hyperlinks so that the hyperlinks either open in a new browser window or in an existing browser window when selected by the user. An interface engine generates the selectable button on the graphical user interface, examines the selectable button for any user settings, and controls the operation of the hyperlinks based upon the user settings.

38 Claims, 4 Drawing Sheets

METHOD AND SYSTEM FOR CONTROLLING THE OPERATION OF HYPERLINKS

TECHNICAL FIELD OF THE INVENTION

The present invention relates generally to network browsing, and more specifically relates to a method and system for controlling the operation of hyperlinks.

BACKGROUND OF THE INVENTION

As the Internet becomes a more prominent means of communication and as more companies are implementing intranets, companies are striving to make both their internal and external web sites accessible to all types of people. The types of people include experienced users, inexperienced users, and people with disabilities such as visual impairments that typically use a screen reader to access and read information presented on Internet and intranet sites.

But making Internet and intranet sites accessible to all is not a simple task and is often overlooked by many web designers. One particular problem is the use of links that launch a new browser instance or window. Links that launch a new browser window are in common use, yet they can be confusing to novice users as well as users of screen readers. Novice users often do not know that a new browser window has launched and are confused by the loss of back button navigation. Novice users are also often confused by overlapping windows or have difficulty managing them, resulting in the accidental closure of browser windows. Users employing screen readers are also confused because the screen reader reads from the newly opened window and the user does not know that a new browser window has launched and believes the information in the original browser window to be lost. Because of this confusion, novice users or users using screen readers may not be able to effectively navigate the Internet or intranets.

BRIEF DESCRIPTION OF THE DRAWINGS

A more complete understanding of the present embodiments and advantages thereof may be acquired by referring to the following description taken in conjunction with the accompanying drawing, in which like reference numbers indicate like features, and wherein.

DETAILED DESCRIPTION OF THE INVENTION

Preferred embodiments of the present invention are illustrated in the figures, like numerals being used to refer to like and corresponding parts of the various drawings.

When working on the Internet or an intranet in a browser such as INTERNET EXPLORER by Microsoft or NAVIGATOR by Netscape, a user selecting a hyperlink allows for the immediate delivery and viewing of another file by the user. Typically the hyperlink either presents content within the existing browser window or it launches a new web browser window in which to present the content, depending on how the hyperlink is configured by the web site developer. As more and more users begin to access the Internet and internal intranets, the variety of the users has increased to include Internet savvy users, inexperienced users, first time users, and visually impaired users.

When browsing, novice users and users employing screen readers are often confused by hyperlinks that open new browser windows when the user selects the hyperlink. A screen reader is a software tool that utilizes speech synthesis technology to speak aloud web-based information as it appears on web sites, allowing those with visual impairment to navigate the Internet and intranets. Novice users are confused because they typically do not realize that a new browser window has opened. Users employing screen readers are confused because the screen reader begins reading from the new browser window and generally does not alert the user that a new browser window has launched. In addition, visually impaired users are unaware of the new browser window because they cannot perceive the necessary visual cues that a new browser window has launched. Therefore they believe they have lost the information in the original web page because they cannot navigate back to it.

Alternatively, Internet savvy users often desire to have numerous browser windows open while working online to allow for multi-tasking. Therefore experienced users often prefer to have hyperlinks open into new browser windows when selected. Regardless of skill level, users currently do not have a choice of having a hyperlink open in a new browser window unless they use the hidden right button functionality, present in such browsers as INTERNET EXPLORER and NAVIGATOR. The hidden right button functionality allows for the opening of a hyperlink in a new browser window. Many novice users are not aware of the hidden right button functionality and all users, novice or experienced, are unable to choose to have a hyperlink open in an existing browser window when the link has been configured by the developer to launch a new browser window.

By contrast, the example embodiment described herein allows users to control the operation of hyperlinks thereby allowing the users to decide if they want a hyperlink to open in a new browser window or in the existing browser window. The ability to select how a hyperlink operates allows both novice and experienced users to browse the Internet and intranets at levels comfortable to them. Furthermore, the example embodiment provides Internet and intranet browsing that is compatible with such devices as screen readers allowing visually impaired users to browse the Internet and intranets with greater ease and less confusion. Consequently, the overall satisfaction of Internet and intranet users increases because the users are able to work at their own level of understanding. In addition, the compatibility with screen readers allows for greater compliance with federal regulations, such as Federal Regulation 508 and Federal Communication Commission (FCC) regulation 255, requiring federal agencies and entities that contract with federal agencies to make electronic and information technology accessible to people with disabilities. These regulations serve to make Internet and intranet sites screen reader accessible.

Figure 1:
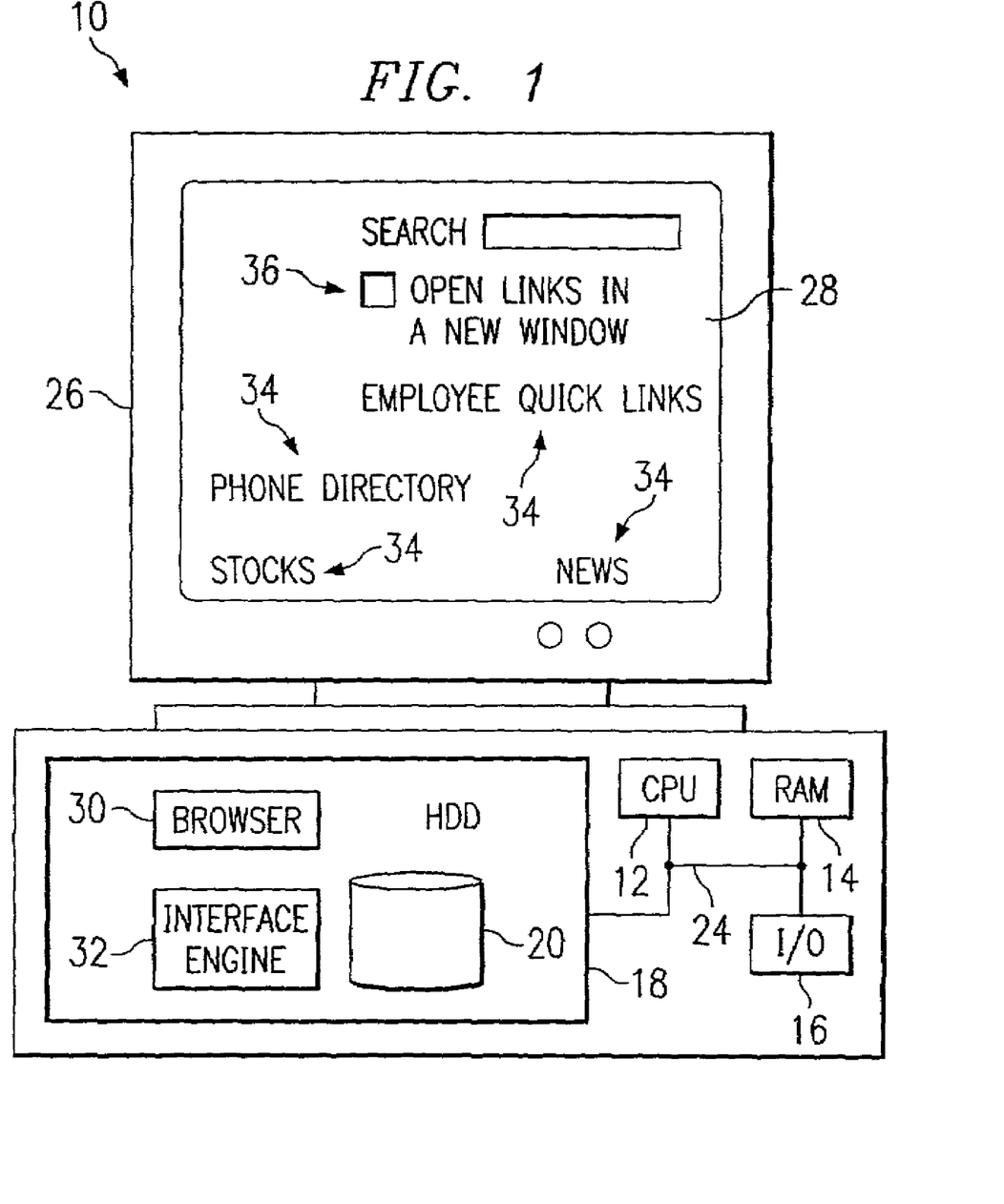
FIG. 1 depicts a block diagram of a system for allowing a user to control the operation of one or more hyperlinks.

Referring now to FIG. 1, a block diagram depicts navigation system 10 for allowing a user to control the operation of one or more hyperlinks. In the example embodiment, navigation system 10 may include respective software components and hardware components, such as processor 12, memory 14, input/output ports 16, hard disk drive (HDD) 18 containing databases 20, and those components may work together via bus 24 to provide the desired functionality. The various hardware and software components may also be referred to as processing resources. Navigation system 10 may be a personal computer, a server, a personal digital assistant (PDA), an Internet appliance, or any other appropriate Internet browsing device with a network interface for communicating over networks such as the Internet, intranets, LANs, or WANs, a display 26 for presenting graphical user interface (GUI) 28, and input devices such as a mouse and a keyboard. Navigation system 10 also includes browser 30 and interface engine 32, which reside in memory such as hard disk drive 18 and are executable by processor 12 through bus 24.

A user accesses the Internet or intranet using navigation system 10 and browser 30. When the user accesses an Internet or intranet site, display 26 exhibits GUI 28 for the Internet or intranet site. Browser 30 presents the HTML content of the Internet or intranet site to the user using GUI 28. Shown in FIG. 1 is an example GUI 28 for a company's intranet home page. GUI 28 is illustrated in greater detail in FIG. 2 and includes such items as hyperlinks 34 for such information as news, stocks, phone directory, personal links or any other appropriate web content for which a web site may want to provide a link.

GUI 28 also includes selectable button 36. In the embodiment shown in FIGS. 1 and 2, selectable button 36 is located near the top of GUI 28. But in alternate embodiments the location of selectable button 36 is flexible with respect to GUI 28. Therefore, selectable button 36 may be located near the bottom of GUI 28, near one of the sides of GUI 28, in the middle of GUI 28, or in any appropriate location with respect to hyperlinks 34 in GUI 28. This flexibility in the placement of selectable button 36 is due to the fact that the placement of selectable button 36 is dynamically bound to the HTML content of the web site thereby allowing a web site developer to place selectable button 36 any place within GUI 28. For interaction with a screen reader, it may be desirable to place selectable button 36 near the top of GUI 28 or preceding a set of hyperlinks 34 so that the user may supply user settings to selectable button 36 prior to selecting a hyperlink 34.

Figure 2:
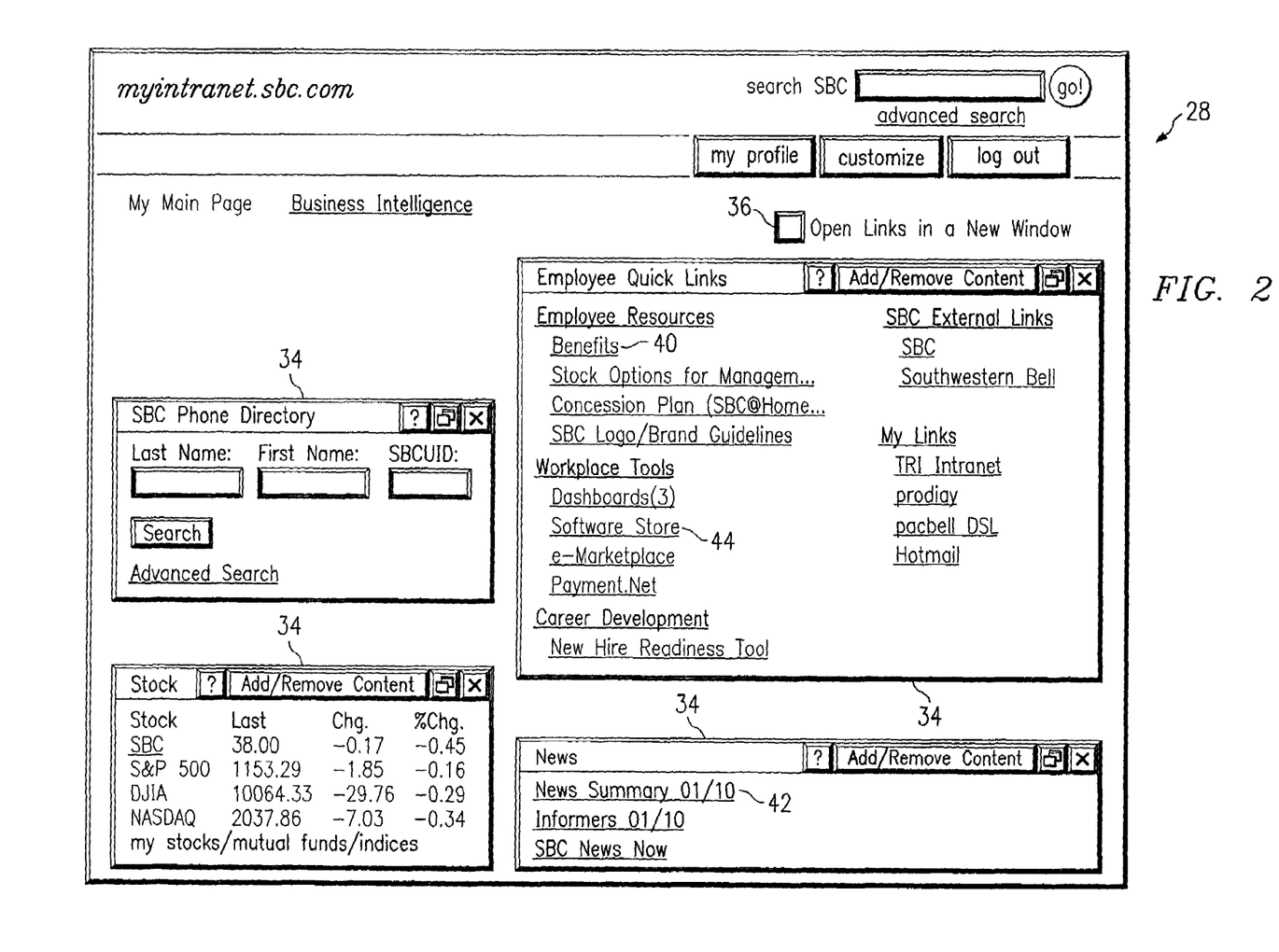
FIG. 2 illustrates an example graphical user interface.

Selectable button 36 is a visual indication that allows the users to decide whether to have hyperlinks 34 open in a new browser window or open in the existing browser window. When the user employs a screen reader, selectable button 36 provides an audio indication in addition to the visual indication of the operation of hyperlinks 34. Selectable button 36 accepts user settings from the user regarding whether the user desires to have hyperlinks 34 open in a new browser window or open in the existing browser window.

When a user accesses a particular web site that allows the users to control the operation of the hyperlinks, interface engine 32 generates selectable button 36 from the HTML content of the web site and inserts selectable button 36 into GUI 28 so that the user can view selectable button 36 on display 26. Interface engine 32 binds the selection made with the user settings at selectable button 36 to the operation of hyperlinks 34. Therefore, if the user selects selectable button 36 indicating to open hyperlinks 34 in a new browser window, then every time the user selects one of the hyperlinks 34, the hyperlink will launch a new browser window. For instance, if the user prefers to multi-task with many different browser windows, then the user indicates to open all hyperlinks 34 in a new browser window at selectable button 36. When the user selects hyperlink 40 regarding benefits, a new browser window is launched for the presentation of benefits web content. Because of the visual indication feature, selectable button 36 indicates that the user has selected to have all hyperlinks 34 open in a new browser window. Therefore, the user will always know whether selecting a hyperlink 34 will open a new browser window and there will be no confusion on the part of the user as to why hyperlinks 34 are opening in new browser windows or in the existing browser window.

User settings into selectable button 36 apply to all of the hyperlinks 34 within GUI 28. If the user selects selectable button 36 so that hyperlinks 34 open in a new browser window, then all hyperlinks 34 when selected by the user will open in a new browser window. For instance, selection of hyperlink 40 opens a new browser window with information regarding benefits. Selection of hyperlink 42 opens a new browser window with news summaries. Therefore, the user will have three browser windows open at the same time: one browser window displaying GUI 28, one browser window displaying benefits information, and one browser window displaying the news summaries. If the user decides that he does not need any more browser windows, the user can unselect selectable button 36 on GUI 28 and the selection of hyperlinks 34 will open in the browser window currently displaying GUI 28.

Each web site incorporating a selectable button 36 also includes a default setting for selectable button 36 to further simplify browsing Internet and intranet web sites for novice users. In the embodiment shown in FIGS. 1 and 2, selectable button 36 is a clear box and is not checked, marked, or otherwise selected. When selectable button 36 is clear and not selected, hyperlinks 34 open in the existing browser window instead of in a new browser window when the user selects a hyperlink 34. Therefore, if the user does not check or mark selectable button 36, then whenever the user selects a hyperlink 34, the selected hyperlink 34 opens in the existing browser window. Therefore, the default setting for GUI 28 is to have hyperlinks 34 open in the existing browser window. But the default setting does not have to be open hyperlinks 34 in the existing browser window. The default setting may also be having selectable button 36 checked, marked, or otherwise selected so that hyperlinks 34 open in a new browser window whenever the user selects a hyperlink 34.

Interface engine 32 determines and sets the default setting for selectable button 36. The default setting may depend in part on what type of users are expected to visit a particular web site. If a web site is expected to receive a large number of novice users or is a government or public web site that must abide by federal regulations regarding equal access to those with disabilities, then the default setting may be set to open hyperlinks 34 in the existing browser window to create less confusion to the novice users or to users employing screen readers. Interface engine 32 sets the default setting by not selecting, marking, or checking selectable button 36. If a web site expects to have many users who are experienced users or if the information on the web site lends itself to multi-tasking with multiple browser windows, then the default setting may be set to open hyperlinks 34 in new browser windows by selecting or marking selectable button 36. Even though a web site may have a default setting, the users are not bound by the default setting and have the ability to change the default setting by either selecting or unselecting selectable button 36.

In addition to applying the user settings at selectable button 36 to all hyperlinks 34 located within GUI 28, interface engine 32 also carries forward the user settings as a default setting on any new browser windows opened by the user where the new browser windows also incorporate the selectable button feature. For example, a user supplies user setting at selectable button 36, by selecting selectable button 36, indicating a desire to have all hyperlinks open in new browser windows. The user then selects hyperlink 44 which opens in a new browser window. Interface engine 32 determines if the newly opened browser window utilizes the selectable button feature thereby allowing users to control the operation of hyperlinks.

If the newly opened browser window does not utilize the selectable button feature, then interface engine 32 does not generate a selectable button, cannot carry forward the user settings, and therefore the user does not have control over the operation of the hyperlinks in the new opened browser window. But if the newly opened browser window does allow users to have control over the operation of hyperlinks, then the newly opened browser window has its own selectable button and interface engine 32 carries forward the user settings to the newly opened browser window. The default setting on the newly opened browser window will be set to the user settings that the user supplied in selectable button 36 on GUI 28—in this instance to open links in a new window. The selectable button on the newly opened browser window will be selected and the default setting will be to open hyperlinks in a new browser window. The user still has the option of changing the default setting if for some reason on the newly opened browser window the user wants the hyperlinks to open in the existing browser window. In alternate embodiments, interface engine 32 may not carry forward the user settings from one GUI to another GUI where both web sites support the selectable button feature. Some web sites may prefer to always have the default setting of selectable button 36 set to a particular setting regardless of the user settings on other web sites.

In addition, selectable button 36 provides a visual interface element that gives the users an indication as to the operation of hyperlinks 34 and the way the users load new data into a web site. With respect to users using screen readers, selectable button 36 provides an auditory interface element in addition to the visual interface element so that the function and status of selectable button 36 will be read to the screen reader user. A graphic button may also be used with an HTML Alt tag. The Alt tag is used to attach a screen reader compatible label or instructions to selectable button 36.

The visibility characteristic of selectable button 36 allows the users to clearly see whether or not the selection of a hyperlinks 34 will open hyperlink 34 in a new browser window or the existing browser window. Also, the visible feature of selectable button 36 is more user friendly, particularly to novice users and users employing screen readers, than the hidden right button click functionality considering that many users are not even aware of the hidden right button functionality. In addition, selectable button 36 allows the users to decide whether hyperlinks 34 open in new browser windows or in the existing browser window unlike the hidden right button functionality which only allows the user to decide to open hyperlinks 34 in a new window browser. The users now have a choice between two options, a new browser window or the existing browser window, instead of opening in a new browser window using the hidden right button functionality or merely selecting a hyperlink and having the hyperlink operate as determined by the web site developer and HTML code.

Selectable button 36 is independent of browser 30 and is part of the web site content itself and is written into the HTML code for the web site. The user does not need to do anything in order for selectable button 36 to appear on GUI 28 for a particular web site and does not need to use particular web browsing software. If the HTML code for a particular web site includes the selectable button feature, then when the user accesses that web site, the user will see selectable button 36 somewhere on GUI 28 and therefore have the ability to control the operation of hyperlinks 34.

Selectable button 36 also simplifies Internet browsing for visually impaired users that employ screen readers. When multiple browser windows launch or open, the screen reader typically reads from the browser window most recently opened. Sometimes the screen reader may inform the user that a new browser window has opened but the user does not understand or realize that a new browser window has opened. Even if the user realizes that new browser windows are being launched, it can be difficult to manage multiple windows with a screen reader Other times the screen reader may not inform the user that a new browser window has opened. If the user does not know that a new browser window has opened, then the user may be confused by the loss of back button functionality. Typically when a user links from one web page to another web page, the new web page launches in the existing browser window and the user can click on the back button to return to the web page that the user was first looking at. But when a new browser window is launched, the user can no longer use the back button to return to the web page that the user was first looking at because the new browser window has no web page to go back to. With loss of back button functionality, the user may become frustrated because the user is stuck at this web site and cannot figure out how to get back to the web site that the user just linked from. With selectable button 36, a visually impaired user employing a screen reader can select selectable button 36 so that either all hyperlinks 34 open in a new browser window or all hyperlinks 34 open in the existing browser window. By the user selecting to open all hyperlinks 34 in the existing browser window, the user will not lose back button functionality and will be able to more efficiently navigate Internet and intranet sites using a screen reader. Being able to control the operation of hyperlinks 34 allows the user to stay in the same browser window if the user so desires and thereby simplify browsing when using a screen reader.

In contrast, experienced users often desire to have hyperlinks 34 launch in a new browser window every time they select a hyperlink 34. Having more than one browser window open at the same time allows for multi-tasking. And being able to select selectable button 36 one time to indicate to open all hyperlinks 34 in new browser windows is more user friendly than using the right button functionality every time the user wants to open a hyperlink 34 in a new browser window.

Figure 3:
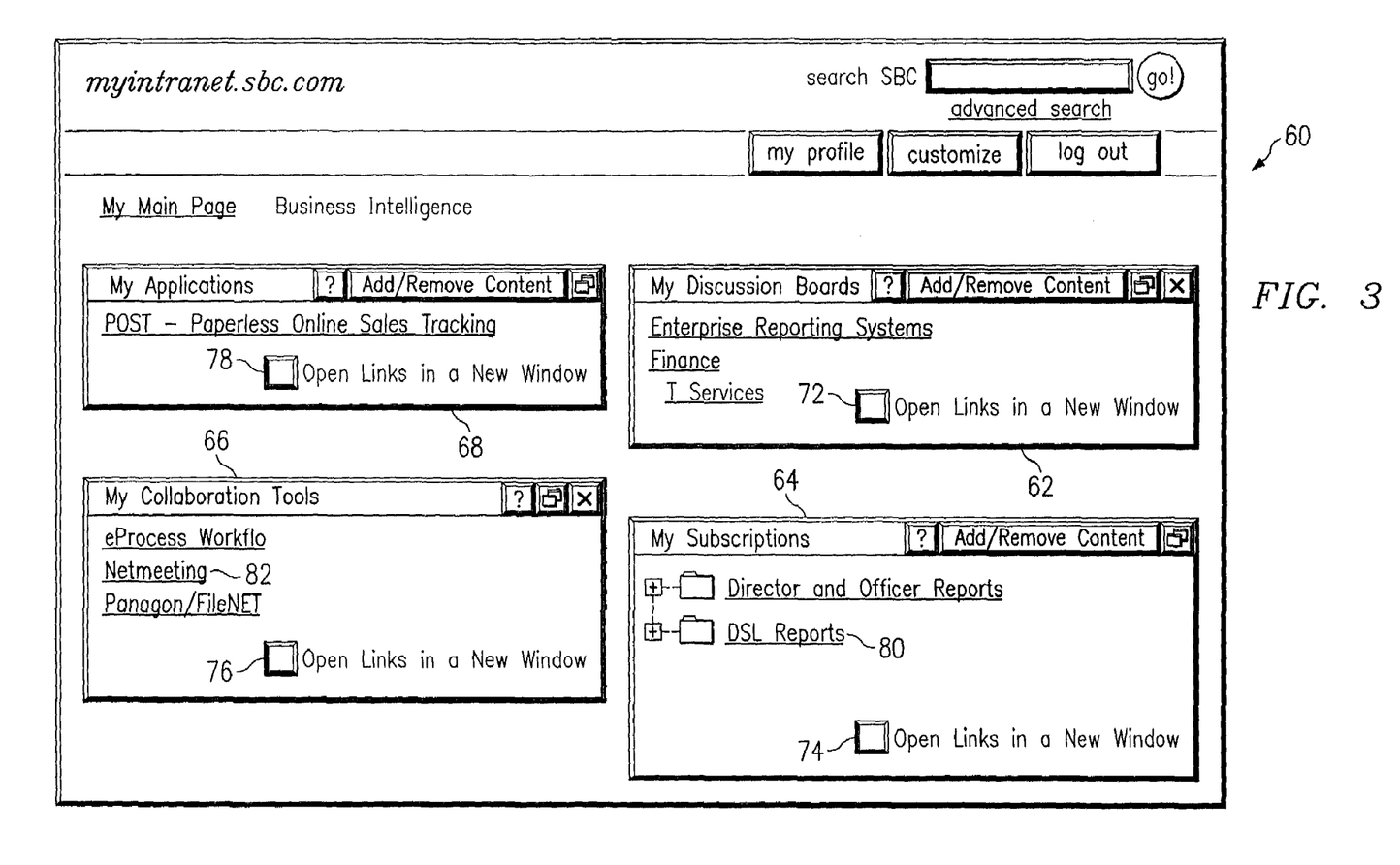
FIG. 3 depicts an example modular graphical user interface.

FIG. 3 depicts an example modular graphical user interface (GUI) 60 that allows users to control the operation of hyperlinks. In addition to GUI 28 which is a single GUI and not divided up into sections or modules, alternate embodiments incorporate a modular GUI 60 where the modular GUI 60 is broken up into one or more sections or modules where each module has its own modular selectable button. Modular GUI 60 is broken into four different distinct modules: module 62, module 64, module 66, and module 68. In alternative embodiments, modular GUI 60 may have more than four or less than four modules. Each module 62, 64, 66, and 68 has its own modular selectable button. Module 62 has modular selectable button 72, module 64 has modular selectable button 74, module 66 has modular selectable button 66, and module 68 has modular selectable button 78. Users can adjust or move the location of modules 62, 64, 68, and 68 within modular GUI 60 and each of the modules 62, 64, 66, and 68 have different content and different hyperlinks.

Modular GUI 60 operates similarly to GUI 28 except that each module 62, 64, 66, and 68 has its own modular selectable button 72, 74, 76, and 78 and the user supplies user settings for each module 62, 64, 66, and 68 instead of just once as for GUI 28. Modular GUI 60 allows each module 62, 64, 66, and 68 to operate independent of each other because each module 62, 64, 66, and 68 has its own modular selectable button 72, 74, 76, and 78. Each modular selectable button 72, 74, 76, and 78 accepts its own user settings independent of the user settings supplied to the other modular selectable buttons 72, 74, 76, and 78. For instance, the user settings supplied by a user at modular selectable button 78 does not affect the user settings supplied to the remaining modular selectable buttons 72, 74, and 76. Therefore, the operation of the hyperlinks within module 68 does not affect the operation of the hyperlinks in modules 62, 64, and 66. For example, a user may wish to view the DSL reports from hyperlink 80 in new browser windows so that the user may more easily compare the different reports. But the user may also want to view the Netmeeting schedule from hyperlink 82 in the existing browser window. Therefore, the user selects modular selectable button 74 in module 62 to indicate to open all hyperlinks within module 64 in a new browser window and the user does not select modular selectable button 76 in module 66 so that the hyperlinks in module 68 open in the existing browser window when selected by the user. Therefore when the user selects hyperlink 80, hyperlink 80 opens in a new browser window. And when the user selects hyperlink 82, hyperlink 82 opens in the existing browser window.

Modular GUI 60 allows for greater control by the user in the operation of hyperlinks. With the distinct modules 62, 64, 66, and 68, the user has greater freedom in that the user can pick and choose how the hyperlinks in each module 62, 64, 66, and 68 will operate based on the user needs and the type of information contained within each module 62, 64, 66, and 68. As describe above with respect to GUI 28, modular GUI 60 incorporates default settings for modular selectable buttons 72, 74, 76, and 78 and carries forward the user settings into the newly opened browser windows.

Figure 4:
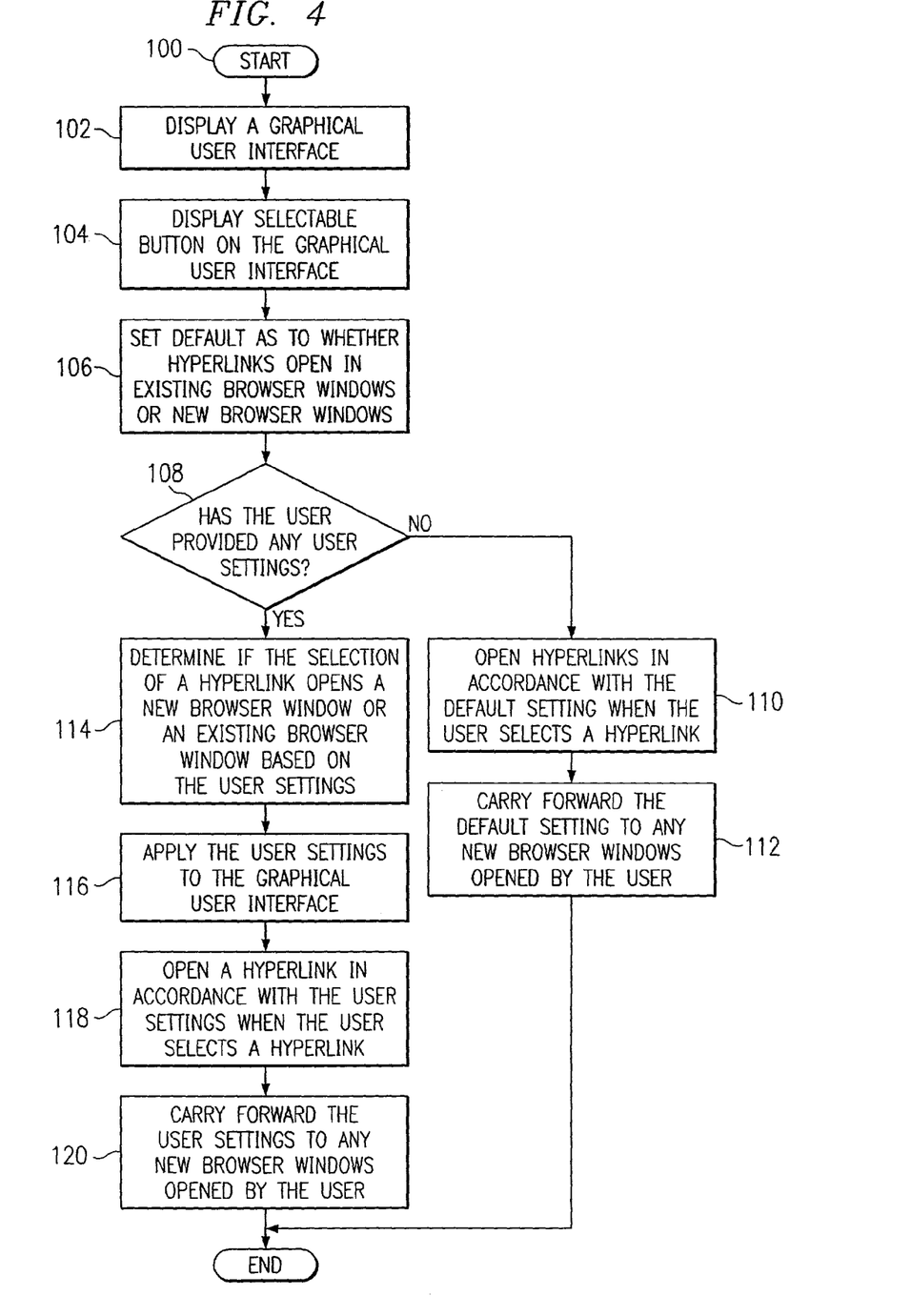
FIG. 4 illustrates a flow diagram of a method for allowing a user to control the operation of one or more hyperlinks.

FIG. 4 illustrates a flow diagram of a method for allowing a user to control the operation of one or more hyperlinks. This method applies to both GUI 28 as well as modular GUI 60 but for discussions purposes, FIG. 4 shall be discussed with respect to GUI 28.

The method begins at step 100 and at step 102 display 26 displays GUI 28 for a particular web site. At step 104, interface engine 32 recognizes that the web site incorporates the selectable button feature. Interface engine 32 generates selectable button 36 and displays selectable button 36 within GUI 28 so that the user may see selectable button 36. Interface engine 32 then checks to see what the default setting for the web site and selectable button 36 is and sets the default setting at step 106. Interface engine 32 either sets the default setting to open all hyperlinks 34 in the existing browser window or open all hyperlinks 34 in new browser windows. The default setting depends on several factors including what is included in the HTML content for the web site and if the user reached this current web site using a hyperlink from another web site that also incorporates the selectable button feature. If the user reached the current web site from a hyperlink from another web site that gives users control over the operation of hyperlinks, then interface engine 32 may need to take into account the user settings from the previous web site and carry forward those user settings as the default for the current web site.

At step 108, interface engine 32 examines selectable button 36 to determine if the user has provided any user settings. The user settings determines whether hyperlinks 34 open in a new browser window or the existing browser window. The user provides user settings by selecting selectable button 36 within GUI 28. If at step 108 interface engine 32 determines that the user has not provided any user settings, then at step 110 interface engine 32 applies the default setting and opens hyperlinks 34 in accordance with the default setting when the user selects a hyperlink 34. If the default setting is to open hyperlinks 34 in the existing browser window, then interface engine 32 opens hyperlinks 34 in the existing browser window whenever the user selects a hyperlink 34. If the default setting is to open hyperlinks 34 in a new browser window, then interface engine 32 opens hyperlinks 34 in a new browser windows whenever the user selects a hyperlink 34. Once interface engine 32 determines and applies the default setting for the operation of hyperlinks 34, at step 112 when the user selects a hyperlink 34 interface engine 32 carries forward the default setting and makes that the default setting for any new or existing browser windows accessed by the user opening hyperlinks 34 and the method ends at step 122.

If at step 108 interface engine 32 determines that the user has provided user settings into selectable button 36, then at step 114 interface engine 32 examines selectable button 36 for the user settings to determine if the selection of hyperlinks 34 results in hyperlinks 34 opening in the existing browser window or in a new browser window. Interface engine 32 then applies the user settings at selectable button 36 to the operation of hyperlinks 34 within GUI 28 at step 116. Once the user has supplied the user settings and interface engine 32 determines how the user wants to control the operation of hyperlinks 34, whenever the user selects a hyperlink 34 at step 118, the hyperlink 34 opens in accordance with the user settings. Interface engine 32 carries forward the user settings to any new browser windows or existing browser windows opened by the user selecting hyperlinks 34 from GUI 28 at step 120 and the process ends at step 122.

Steps 108 through 120 may be repeated every time the user selects a hyperlink 34 because the user has the ability to change the user settings at any time while browsing and thereby change the operation of hyperlinks 34. Whenever a user selects a hyperlink 34, interface engine 32 determines if there is any user settings to determine if the hyperlink 34 opens in a new browser window or the existing browser window.

Although the present invention has been described in detail, it should be understood that various changes, substitutions and alterations can be made hereto without the parting from the spirit and scope of the invention as defined by the appended claims.

What is claimed is:

1. A system for allowing a user to control the operation of one or more hyperlinks, the system comprising:
   a browser operable to read HTML;
   a graphical user interface associated with the browser, the graphical user interface operable to display an HTML file having a plurality of modules;
   a plurality of selectable buttons, each associated with one of the modules of the HTML file, each selectable button operable to accept one or more user settings regarding the operation of hyperlinks within the respective module and to provide a visual indication of the user settings, wherein the plurality of selectable buttons and the user settings regarding the operation of hyperlinks within the respective modules are simultaneously displayed on a web page;
   a display associated with the browser, the display operable to display the graphical user interface and the selectable buttons; and
   an interface engine associated with the selectable buttons and graphical user interface, the interface engine operable, for each selectable button, to generate the selectable button, examine the selectable button to determine if the user has provided any user settings, and control the operation of the hyperlinks within the module associated with the selectable button based upon the user settings.

2. The system of claim 1 wherein the HTML file is a single HTML document having a plurality of modules.

3. A method for allowing a user to control the operation of one or more hyperlinks, the method comprising:
displaying via a graphical user interface a web page including a plurality of modules;
inserting a selectable button in each module of the web page;
at each selectable button, accepting and displaying one or more user settings regarding the operation of hyperlinks within the module associated with that selectable button, wherein the selectable buttons and the user settings regarding the operation of hyperlinks within each of the plurality of modules are simultaneously displayed on the web page; and
for each selectable button, controlling how one or more hyperlinks within the module associated with that selectable button operate based upon the user settings associated with that module.

4. The method of claim 3 wherein accepting one or more user settings associated with each module comprises examining the selectable button associated with that module to determine if the user has supplied any user settings.

5. The method of claim 3 wherein the user settings associated with each module comprise information regarding whether the user wants a hyperlink within that module to launch in a new browser window or in an existing browser window.

6. The method of claim 3 wherein controlling how one or more of the hyperlinks within each module operate comprises determining if the user has supplied any user settings via the selectable button associated with that module.

7. The method of claim 3 wherein controlling how one or more of the hyperlinks within each module operate comprises determining if a hyperlink launches in a new browser window or an existing browser window based on the user settings for that module.

8. The method of claim 3 wherein controlling how one or more of the hyperlinks within each module operate comprises launching a hyperlink in a new browser window when the user selects the hyperlink based on the user settings for that module.

9. The method of claim 3 wherein controlling how one or more of the hyperlinks within each module operate comprises launching a hyperlink in an existing browser window when the user selects the hyperlink based on the user settings for that module.

10. The method of claim 3 further comprising visually indicating one or more of the user settings.

11. The method of claim 3 further comprising:
distinguishing between the modules and associated selectable buttons; and
controlling the operation of one or more hyperlinks within one of the modules in accordance with the user settings associated with the associated selectable button and independent of the operation of the other modules.

12. The method of claim 3 wherein controlling how one or more of the hyperlinks within each module operate comprises setting a default when the user fails to provides the user settings for that module.

13. The method of claim 3 further comprising applying the user settings selected via one of the selectable buttons to all of the hyperlinks within the graphical user interface.

14. The method of claim 3 wherein controlling how one or more of the hyperlinks within each module operate comprises carrying forward the user settings for that module from an existing browser window to a new browser window.

15. The method of claim 3 wherein displaying a web page including a plurality of modules comprises displaying a single web document including a plurality of modules.

16. Software for allowing a user to control the operation of one or more hyperlinks, the software embodied in a computer-readable medium and operable to:
display via a graphical user interface a web page including a plurality of modules;
insert a selectable button in each module of the web page;
at each selectable button, accept and display one or more user settings regarding the operation of hyperlinks within the module associated with that selectable button; and
for each selectable button, control how one or more hyperlinks within the module associated with that selectable button operate based upon the user settings associated with that module.

17. The software of claim 16 wherein accepting one or more user settings associated with each module comprises examining the selectable button associated with that module to determine if the user has supplied any user settings.

18. The software of claim 16 wherein controlling how one or more of the hyperlinks with each module operate comprises determining if the user has supplied any user settings for that module.

19. The software of claim 16 wherein controlling how one or more of the hyperlinks within each module operate comprises determining if a hyperlink launches in a new browser window or an existing browser window based on the user settings for that module.

20. The software of claim 16 wherein controlling how one or more of the hyperlinks within each module operate comprises launching a hyperlink in a new browser window when the user selects the hyperlink based on the user settings for that module.

21. The software of claim 16 wherein controlling how one or more of the hyperlinks within each module operate comprises launching a hyperlink in an existing browser window when the user selects the hyperlink based on the user settings for that module.

22. The software of claim 16 further operable to apply the user settings selected via one of the selectable buttons to all of the hyperlinks within the graphical user interface.

23. The software of claim 16 wherein displaying a web page including a plurality of modules comprises displaying a single web document including a plurality of modules.

24. A system for controlling the operation of hyperlinks, the system comprising:
a graphical user interface operable to display an HTML file having a plurality of modules;
a plurality of selectable buttons, each associated with one of the modules of the HTML file, each selectable button operable to accept and display one or more user settings regarding the operation of hyperlinks within the respective module, wherein the plurality of selectable buttons and the user settings regarding the operation of hyperlinks within the respective modules are included in the displayed HTML file; and
an interface engine associated with the selectable buttons and graphical user interface, the interface engine operable, for each selectable button, to generate the selectable button and control the operation of the hyperlinks within the module associated with the selectable button based upon the user settings.

25. The system of claim 24 further comprising a browser operable to read HTML.

26. The system of claim 24 further comprising a display operable to display the graphical user interface and the selectable button.

27. The system of claim 24 wherein the user settings for each module comprise information regarding whether the user wants a hyperlink within that module to launch in a new browser window or in an existing browser window.

28. The system of claim 24 wherein the user settings for each module determine if selecting a hyperlink within that module launches the hyperlink in a new browser window or in an existing browser window.

29. The system of claim 24 wherein the placement of each selectable button is flexible in relation to the graphical user interface.

30. The system of claim 24 wherein the interface engine is further operable to examine each selectable button to determine if the user has provided any user settings for the module associated with that selectable button.

31. The system of claim 24 wherein the interface engine is operable to launch a new browser window when the user selects a hyperlink within one of the modules based on the user settings for that module.

32. The system of claim 24 wherein the interface engine is operable to launch a hyperlink in an existing browser window when the user selects a hyperlink within one of the modules based on the user settings for that module.

33. The system of claim 24 wherein the interface engine is further operable to:
   distinguish between the modules and associated selectable buttons; and
   control the operation of one or more hyperlinks within one of the modules in accordance with the user settings associated with the associated selectable button and independent of the operation of the other modules.

34. The system of claim 24 wherein each selectable button is further operable to provide a visual indication of one or more of the user settings selected via that selectable button.

35. The system of claim 24 wherein the interface engine is further operable to set each selectable button to a default when the user does not provide any user settings via that selectable button.

36. The system of claim 24 wherein the interface engine is further operable to apply the user settings for a particular module from an existing browser window to a new browser window.

37. The system of claim 24 wherein the HTML file is a single HTML document having a plurality of modules.

38. A system for controlling the operation of hyperlinks, the system comprising:
   a graphical user interface operable to display an HTML file having a plurality of modules;
   a plurality of selectable buttons, each associated with one of the modules of the HTML file, each selectable button providing an interface for setting one or more user settings regarding the operation of hyperlinks within the respective module, wherein the current user setting for each module is displayed within the respective selectable button; and
   an interface engine associated with the selectable buttons and graphical user interface, the interface engine operable, for each selectable button, to generate the selectable button and control the operation of the hyperlinks within the module associated with the selectable button based upon the user settings.

* * * * *